No. 869,583. PATENTED OCT. 29, 1907.
W. W. MACFARREN.
SPRING SUSPENSION FOR VEHICLES.
APPLICATION FILED MAY 28, 1906.

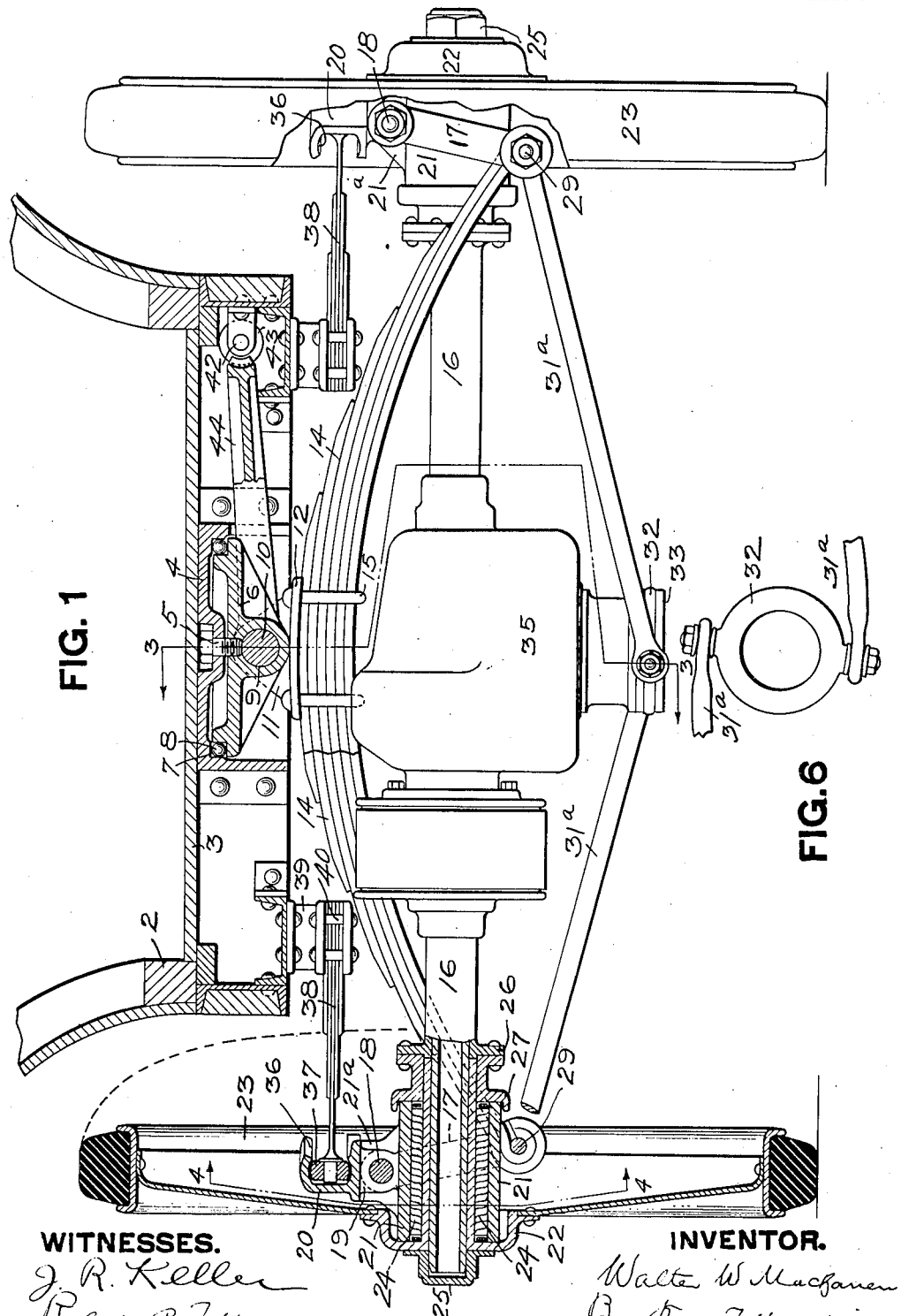

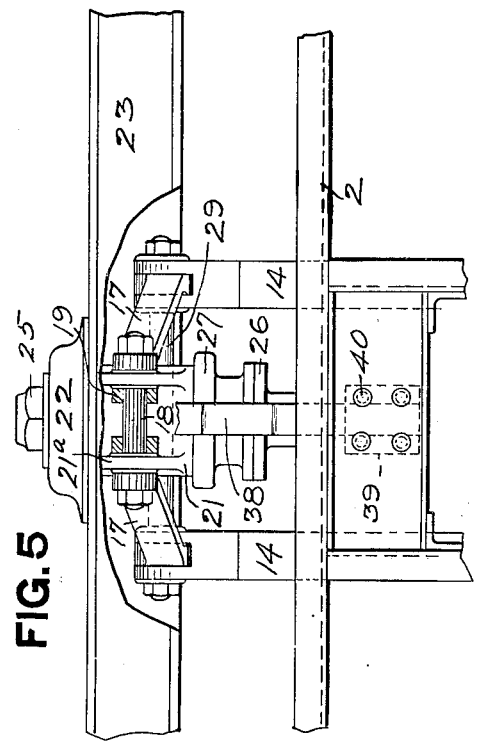
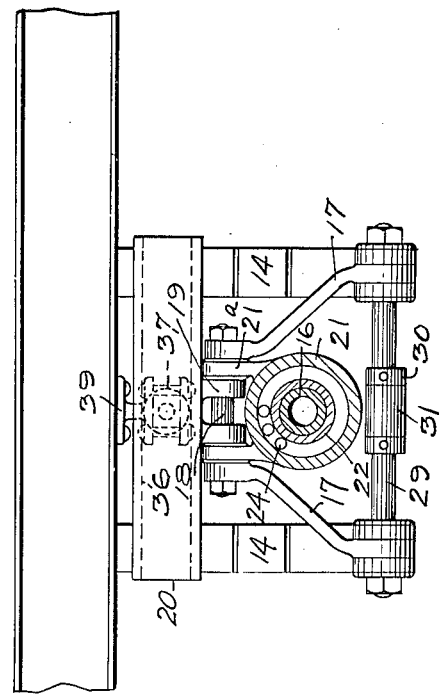
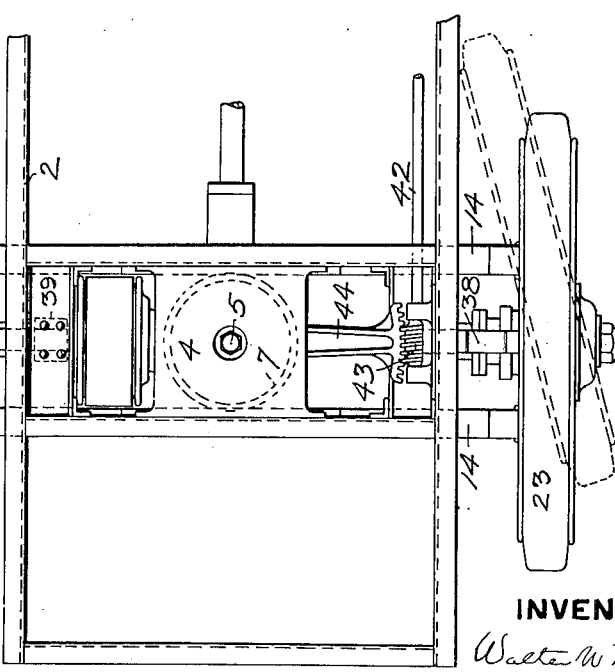

4 SHEETS—SHEET 3.

WITNESSES.
J. R. Keller
Robert C. Totten

INVENTOR.
Walter W. Macfarren
By Kay Totten & Winter
attorneys

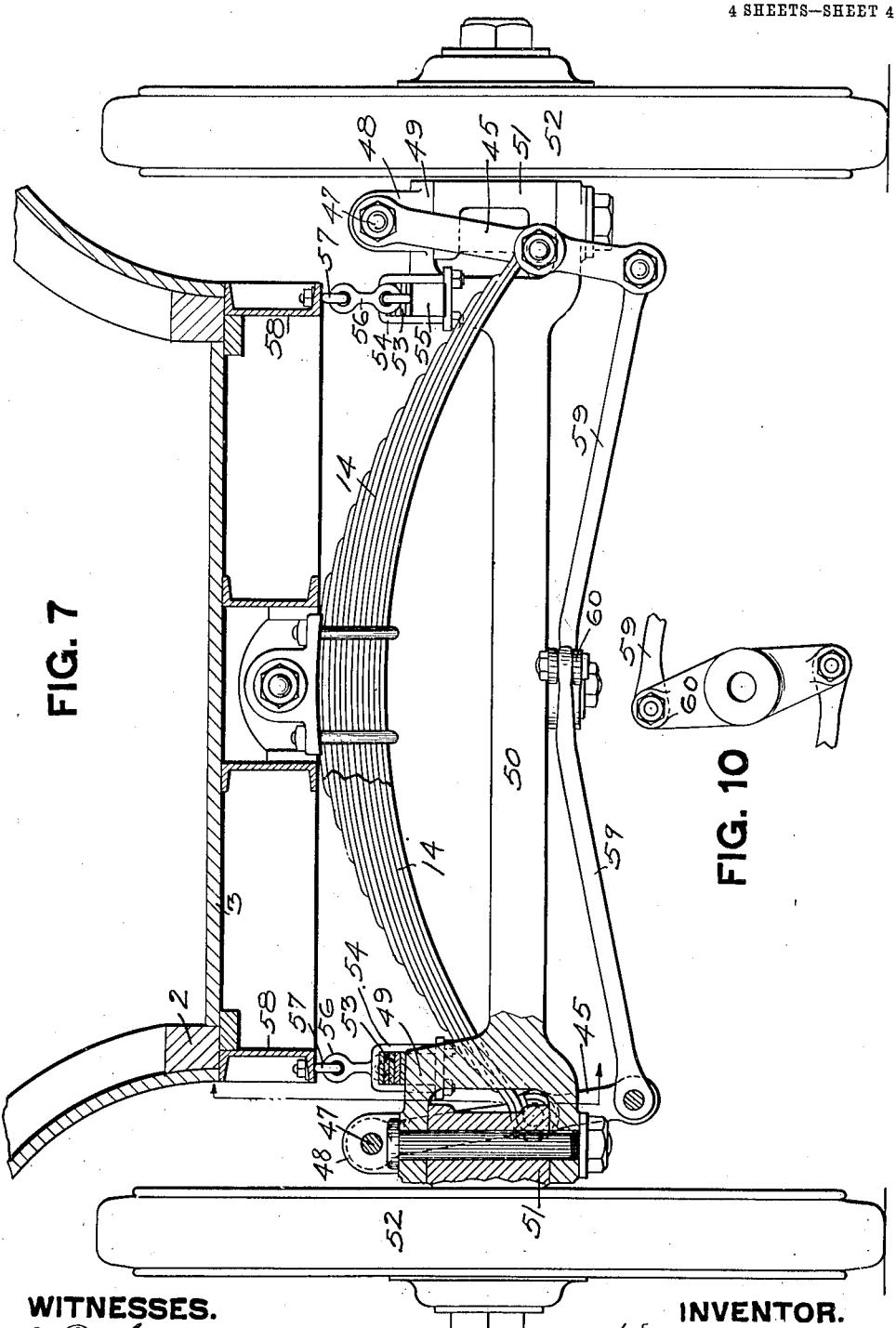

UNITED STATES PATENT OFFICE.

WALTER W. MACFARREN, OF PITTSBURG, PENNSYLVANIA, ASSIGNOR TO WILLIAM H. DONNER, OF PITTSBURG, PENNSYLVANIA.

SPRING-SUSPENSION FOR VEHICLES.

No. 869,583.              Specification of Letters Patent.              Patented Oct. 29, 1907.

Application filed May 28, 1906. Serial No. 319,126.

*To all whom it may concern:*

Be it known that I, WALTER W. MACFARREN, a resident of Pittsburg, in the county of Allegheny and State of Pennsylvania, have invented a new and useful Improvement in Spring-Suspension for Vehicles; and I do hereby declare the following to be a full, clear, and exact description thereof.

My invention relates to spring suspension for vehicles.

The object of my invention is to provide for the supporting and distributing of the weight of a vehicle body carried on four wheels so that the weight will be substantially evenly distributed on all four wheels no matter what their relative position on the ground may be, so that a vehicle moving over uneven ground with the wheels rising and falling in any relation which they may be obliged to assume will still preserve practically the even distribution of the weight.

To these ends my invention comprises, generally stated, the supporting of the vehicle body on springs extending transversely of the vehicle body, the springs, four in number, being located one on each side of the axle, each pair of springs being connected at their ends to a compensating device and swinging from a pivotal point at the mid-point of said springs.

My invention further comprises the employment of a supplementary set of springs whose purpose is to preserve the equilibrium of the body when the wheels assume varying levels, said springs acting on both sides of the vehicle to resist a tendency of the body of the vehicle to tip either way.

Figure 9:
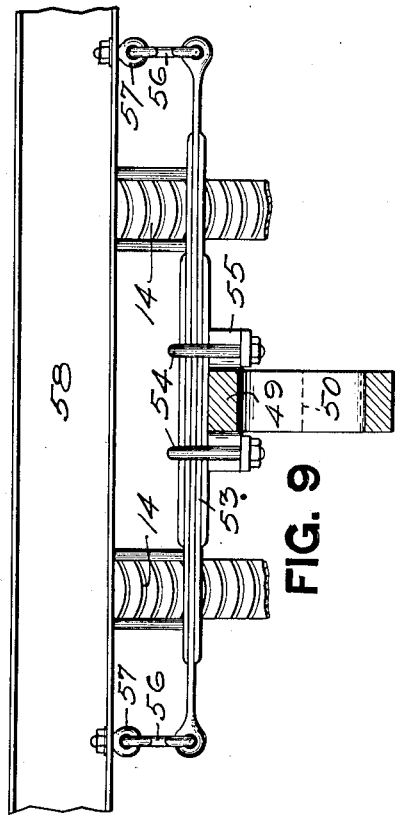
Figure 3:
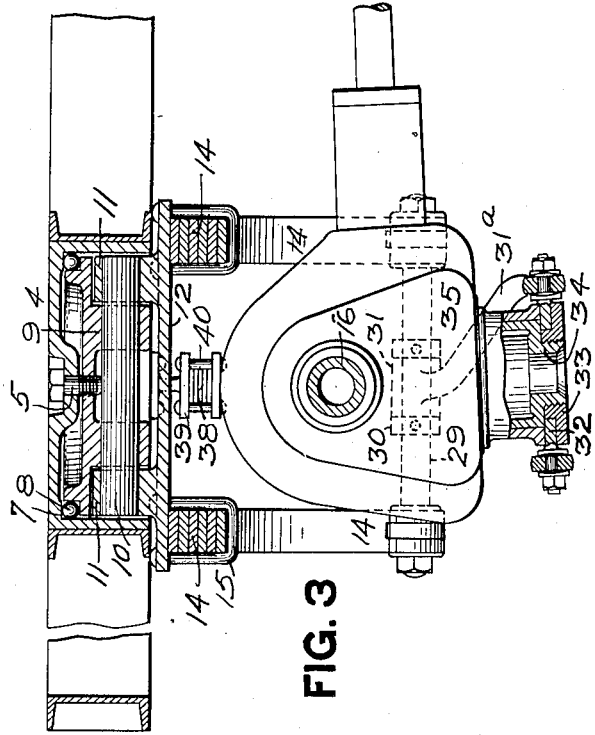
Figure 8:
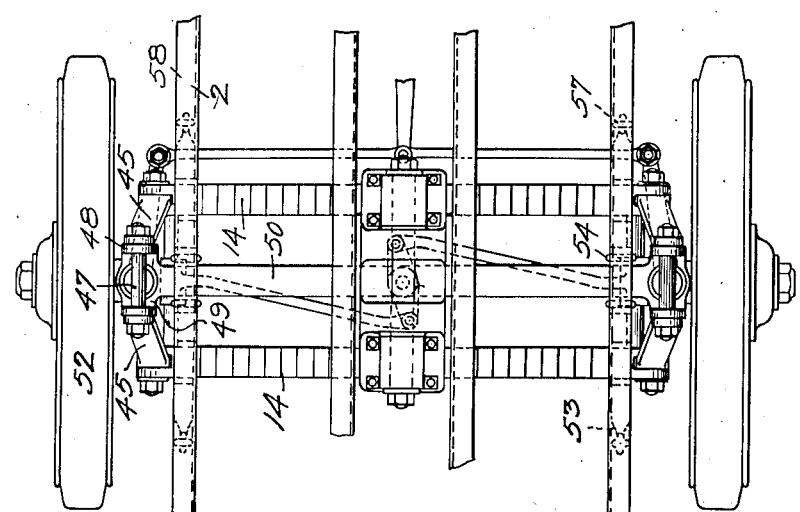

In the accompanying drawings Figure 1 is a front view of a portion of a vehicle showing one of the wheels and the body portion of the vehicle in section; Fig. 2 is a plan view thereof; Fig. 3 is a cross section on the line 3—3, Fig. 1; Fig. 4 is a view looking inward toward one of the wheels, on the line 4—4, Fig. 1; Fig. 5 is a top view of one of the wheels partly broken away to show the manner of supporting the springs; Fig. 6 is a detail of the compensator; Fig. 7 is a modified form of my invention in which the knuckle steering is employed; Fig. 8 is a top or plan view of the same; Fig. 9 is a side view; and Fig. 10 is a detail of the compensator.

Referring to Fig. 1 I have there illustrated my invention in connection with an automobile or other vehicle, a portion, 2, of which only is illustrated showing the lower body portion of such a vehicle. Secured to the bottom 3 of the vehicle is the bearing plate 4 to which is secured by means of the screw 5 the center plate 6. A ball race 7 is formed between the bearing plate 4 and the center plate 6 to receive the balls 8 which form the ball bearing. Formed in the center plate 6 is the bearing 9 through which passes the shaft or pin 10 which also passes through the lugs 11 forming part of the plate 12 which is connected to the springs 14 by means of the U-bolts 15. These springs 14 are leaf springs composed of leaves of different lengths, as in the ordinary manner, and these springs are arranged one on each side of the axle 16, as clearly indicated in Fig. 3.

The outer ends of the springs 14 are connected to the lower ends of the links 17. These links 17 are pivoted on the pins 18 which pass through lugs 19 on the plate 20. This plate 20 is carried by the axle box 21. The axle box 21 has also the lugs 21ª through which pin 18 passes. The wheel 23 is dished which brings the point of suspension of the vehicle or weight on the pins 18 directly on the center line of the wheels. Between the axle box 21 and the hub 22 of the wheel 23 is the roller bearing 24. The wheel 23 runs loosely on the axle 16 and the nut 25 is secured to the outer end of said axle. Secured to the flange 26 on the axle is the dust guard 27. The lower ends of the links 17 are connected by the bolts 29. On the bolts 29 are the collars 30 and between said collars the ring 31 on the ends of the arms 31ª is located. These arms 31ª extend from the bolts 29 and are bent, as indicated in Fig. 3, so as to engage opposite sides of the compensating ring 32. This compensating ring 32 is supported by the collar 33 engaging a threaded neck 34 extending down from the gear casing 35. The compensating ring is free to turn in its seat and in this way the compression of the springs 14 is taken up by the connection of the arms 31ª with said compensating ring.

Formed in the plate 20 on the axle box 21 is the curved guide 36 which forms a guide for the idle rollers 37 on the ends of the balance springs 38. These balance springs 38 are located about midway of the springs 14 and parallel therewith and are secured to the vehicle body by means of the brackets 39, said springs being held within said brackets by means of the bolts or rivets 40. These springs 38 are made up of leaves of varying length, the central single leaf being the longest and the other shorter leaves in pairs on the opposite sides of the long center leaf, each pair shorter than the preceding so that the spring will resist a pull in either direction vertically, that is, either up or down.

Where the straight axle is employed and the steering is done by the turning of the axle, the ordinary form of steering gearing will be employed, a portion thereof being illustrated in Fig. 2 in which the shaft 42 is connected to the steering wheel and on the outer end of said shaft is the worm 43 which meshes with the segmental toothed arm 44 connected with the center plate 6.

When my invention is used in the form just described it will be apparent that the springs 14 carry the greater part of the load and that the weight will be substantially evenly distributed on all four wheels no matter what their relative position on the ground may be. If the vehicle have no load, or a light load, the balancing springs may be flexed upwards, i. e. in opposition to the main springs. In this case the main springs would carry the entire weight of the body and load, and in addition a certain load from the balancing springs.

If the vehicle be heavily loaded the balancing springs would carry a small proportion of the weight, owing to their being flexed downwards by the extreme deflection of the main springs. The balancing springs should be practically under no load strain when the vehicle is under its average working load. Under these conditions with double acting balancing springs, all four balancing springs would be in condition to act immediately to preserve equilibrium. The proportional amount of weight carried by the main and balancing springs will depend on the conditions of service, as for instance, the speed of vehicle, conditions of road, etc. The division of the weight between the two sets of springs will also depend on the type of vehicle; for instance, a low vehicle for heavy loads, and low speeds, would have extremely strong main springs, and comparatively weak balancing springs, while in a high pattern of vehicle, as an omnibus, for high or moderate speeds, especially for carrying passengers, would have comparatively stronger balancing springs, owing to the greater measure of centrifugal force at higher speeds, and with a higher center of gravity. It will thus be seen that my spring suspension is adapted to a great variety of conditions and constructions, and that various constructions may be made other than those shown, without departing from the spirit of my invention. It is also obvious that other methods of cushioning might be employed beside springs.

If the wheels on one side enter a depression in the roadway and the springs 14 on that side are depressed, the springs being carried by the suspension links will through connection from both ends with the compensator 32 act to compensate for the end travel of the springs in such a way that the vehicle will maintain a rigid and unvarying relation to the wheel sidewise, that is, parallel to the axle. This compensating mechanism permits the springs to play vertically freely throughout their entire movement but restrains the spring as a whole from moving sidewise. The pivoting of the springs at the middle or top permit of the movement of the springs independent of the body of the vehicle, while at the same time the balancing springs 38 resist a tendency of the body to tip either way. As the balancing springs are of such construction that they will resist a pull in either direction vertically, that is, either up or down, all four of the balancing springs are brought into action instead of only two, which would be the case if said springs acted in either compression or tension only. This is due to the peculiar construction of the balancing springs with the long center leaf inclosed on opposite sides by leaves of reduced length. Furthermore the outer ends of the balancing springs with their idle rollers 37 engaging the curved guideway 36 permit the axle and wheels to assume the position indicated in dotted lines, Fig. 2, without affecting the position of the balancing springs.

As indicated in Fig. 1, the point of suspension of the links 17 is on the center line of the wheel whereby all the weight is on the center line of the wheel and the axle is relieved from strains except those of torsion and of side thrust due to inequalities of the road. In other words, the axles carry practically none of the weight at all, except that of power transmitting mechanism.

In Fig. 7 I have illustrated my invention as applied to a vehicle in which knuckle steering is employed. In this construction the transverse springs 14 are connected up to links 45 which are in this case carried by the pins 47 passing through the lugs 48 on the upright arm 49 of the axle 50. There is the ordinary knuckle joint 51 between the axle and the wheel 52. In this construction the balancing springs 53 project at right angles to the springs 14 and said balancing springs are secured in place by the U-bolts 54 which pass down and around lugs 55 on the arm 49 of the axle 50. The outer ends of the balancing springs 53 are connected by links 56 to the eye-bolts 57 in the channels 58 extending longitudinally of the body of the vehicle. The lower ends of the springs 14 and the links 45 are connected by the arms 59 with the compensator 60, as in the construction previously described. This modified construction will operate in substantially the same manner as that of the construction previously described and by having the balancing springs clipped directly to the axles and adapted to act in either compression or tension, they act to preserve the equilibrium of the body of the vehicle when the wheels assume varying levels. The compensation of the end movement of the main springs is provided for in the same manner as above described.

The essence of my invention is the separation in the cushioning devices, of the functions of weight carrying and balancing, so that in a four wheeled vehicle, any one, or two diagonally opposite wheels may rise or fall, independently or simultaneously, without appreciably disturbing the level of the vehicle, producing undue strains in it, or affecting the equal distribution of weight on the wheels. For automobile use this latter point is of great advantage, particularly when all four wheels are power driven, because in the usual method of applying power to four wheels from a single motor, differential gears are employed between each pair of wheels, and also between the axles, or the two pairs of wheels. In this case if a single wheel loses traction the vehicle will stop, and that wheel rotate at four times its usual speed.

As weight is the principal factor in tractive effort it will be readily seen that such disablement of the vehicle is much less liable to occur with my spring suspension than with the ordinary constructions.

By the term "spring" as used in the claims I desire to include any suitable cushioning device.

What I claim is:

1. In a vehicle, the combination of a body or frame, main springs supporting same, and supplemental balancing springs adapted to carry a portion of the load.

2. In a vehicle, the combination of a body or frame, main springs pivotally mounted on said body substantially on the longitudinal center line thereof, and supplementary balancing springs on the outer side of said body to preserve equilibrium.

3. In a vehicle, the combination of a body or frame, main springs arranged transversely of said body, and balancing springs extending from said body and having their outer ends supported by the axles and adapted to carry a portion of the load.

4. In a vehicle, the combination of a body or frame, main springs extending transversely of said frame, and supplementary balancing springs secured to said frame, the outer ends of said springs engaging a curved guideway supported by the axle.

5. In a vehicle, the combination of a body or frame, main springs supporting said body and arranged transversely thereof, a horizontally operated compensator, the outer ends of said springs being connected with said compensator, and supplemental balancing springs.

6. In a vehicle, the combination of a body or frame, main springs supporting said body and arranged transversely thereof, an oscillating horizontally arranged compensator connections between said compensator and the ends of said springs, and supplemental balancing springs.

7. In a vehicle, the combination of a body or frame, main springs supporting said body and pivotally connected thereto transversely of said body, a compensating device, and connections between the ends of said springs and said compensating device.

8. In a vehicle, the combination of a body or frame, and a balancing spring adapted to retard the motion of said body vertically in either direction.

9. In a vehicle, the combination of a body or frame, a balancing or equilibrium spring adapted to retard motion of the body vertically in either direction, said spring comprising a prolonged central leaf, and successively shorter leaves at opposite sides of said prolonged leaf.

10. In a vehicle, the combination of a body or frame, a balancing or equilibrium spring adapted to retard motion of the body vertically in either direction, said spring secured at one end to said body, the outer end of said spring being supported by the axle.

11. In a vehicle, the combination of a body or frame, a balancing or equilibrium spring adapted to retard motion of the body vertically in either direction, said spring being secured at one end to said body, and a curved guideway supported by said axle with which the outer end of said spring engages.

12. In a vehicle, the combination of a body or frame, mainsprings having a centrally hinged pivot intermediate the body and axles, and a supplemental equilibrium spring.

13. In a vehicle, the combination of a body or frame, axles, main springs supporting said body arranged transversely thereof and pivotally mounted thereon, links supported by said axles and connected to the outer ends of said springs, a compensating device, and connections between the outer ends of said springs and said compensating device.

14. In a vehicle, the combination of a body or frame, axles, springs pivotally connected to said body and arranged transversely thereof, a hub on the axle, lugs on said hub, a pin journaled in said lugs, links carried by said pin connected to the outer ends of said springs, a compensating device, and connections between the outer ends of said springs and said compensating device.

15. In a vehicle, the combination of a body or frame, axles, wheels, and means independent of the axles for suspending the weight in the center line of said wheels.

16. In a vehicle, the combination of a body or frame, axles, wheels, links suspended from a point on the center line of the wheels, and connections between said links and said body or frame.

17. In a vehicle, the combination of a body or frame hinged longitudinally on the center line, and balancing springs.

18. In a vehicle, a semi-elliptic or flat spring, links, one end of said links being connected to the body or axle and the other end connected to an end of the spring, a pin fixed to the body or axle, a lever centrally mounted on said pin and connections between the ends of said lever and links to form a compensator.

In testimony whereof, I the said WALTER W. MACFARREN have hereunto set my hand.

WALTER W. MACFARREN.

Witnesses:
ROBERT C. TOTTEN,
J. R. KELLER.